(12) United States Patent
Swartzendruber et al.

(10) Patent No.: US 6,467,853 B1
(45) Date of Patent: Oct. 22, 2002

(54) KEYED ANTI-WEAR THRUST WASHER STRUCTURE

(75) Inventors: James Allen Swartzendruber, West Bend, WI (US); Wayne Robert Hutchison, Mayville, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/634,189

(22) Filed: Aug. 9, 2000

(51) Int. Cl.⁷ .................... B60B 23/00; F16H 57/02; F16B 43/00

(52) U.S. Cl. .................... 301/111.04; 74/607; 411/531; 411/538

(58) Field of Search ................ 403/167, 168; 411/531, 538, 542, 939, 131, 140, 216, 217, 948; 74/607; 301/111.02, 111.04, 112, 122

(56) References Cited

U.S. PATENT DOCUMENTS

| | | | | | |
|---|---|---|---|---|---|
| 1,086,343 | A | * | 2/1914 | Anderson | 411/531 |
| 1,211,553 | A | * | 1/1917 | Dervoz | 411/217 |
| 1,580,015 | A | * | 4/1926 | Clark | 411/131 |
| 3,376,714 | A | * | 4/1968 | Manoni | 411/531 |
| 4,191,872 | A | * | 3/1980 | Sorenson | 411/538 |
| 5,573,311 | A | * | 11/1996 | Clohessy | 301/105.1 |
| 5,618,143 | A | * | 4/1997 | Cronin et al. | 411/120 |
| 5,795,037 | A | * | 8/1998 | Hagelthorn | 301/105.1 |
| 5,846,001 | A | | 12/1998 | Muntnich et al. | 384/620 |
| 6,244,137 | B1 | * | 6/2001 | Wigness | 74/607 |

* cited by examiner

Primary Examiner—S. Joseph Morano
Assistant Examiner—Jason R. Bellinger

(57) ABSTRACT

A thrust washer structure includes a non-rotating washer which bears against the transmission housing. A rotating outer washer is positioned over the axle and includes a tab projecting at a right angle from a portion of the washer face such that the tab engages an existing keyway in the wheel hub or bushing utilized to transmit drive from the axle to the drive wheel.

8 Claims, 2 Drawing Sheets

KEYED ANTI-WEAR THRUST WASHER STRUCTURE

BACKGROUND OF THE INVENTION

1) Field of the Invention

The present invention relates generally to drives for vehicles such as lawn and garden tractors and, more specifically, to thrust washers for axle shafts of such vehicles.

2) Related Art

Lawn and garden tractors typically include drive wheels mounted on keyed axle shafts. The drive wheels or wheel hubs are often free floating on the keyed axle shafts and deliver thrust against the transmission housing in the area around the shafts. A non-rotating washer which engages the transmission housing is placed between the end of the housing and the wheel or wheel hub to protect the axle seal. However, after continued use the washer can wear through and no longer protect the seal. Once the washer is worn through and seal damage occurs, transmission fluid can be lost, resulting in costly transmission failure. One solution to the thrust washer wear problem is to place a second washer on the shaft which rotates with the shaft and bears against the non-rotating washer. Using the two washer approach results in significantly increased washer life. However, keying the second washer to the rotating shaft has proven to be costly because the wheel hubs or wheel bushings have to be machined to provide a mating notch for a tab which projects from the plane of the rotating washer at an angle of about 45 degrees.

BRIEF DESCRIPTION OF THE INVENTION

It is therefore an object of the invention to provide an improved thrust washer structure for the drive of a vehicle such as a lawn and garden tractor. It is another object of the invention to provide such a structure which overcomes the aforementioned problems.

It is a further object of the invention to provide an improved thrust washer structure for a vehicle drive which includes a fixed washer and a second washer keyed to rotate with the drive axle. It is another object to provide such a structure which has a significantly increased wear life compared to a single washer thrust arrangement but which is relatively inexpensive. It is still another object to provide such a structure which obviates a machining step by eliminating the notch for the projecting tab of the rotating washer.

A thrust washer structure constructed in accordance with the teachings of the present invention includes a first non-rotating washer which bears against the transmission housing. A rotating outer washer is positioned over the axle and includes a tab projecting at a right angle from a portion of the washer face such that the tab engages an existing keyway utilized to transmit drive from the axle to the drive wheel. In the embodiment shown, the tab seats in a keyway located in the wheel hub or bushing.

The thrust washer structure requires no machined notches and instead utilizes an existing keyway, thereby saving manufacturing time and expense. Since an existing keyway is utilized, the rotating keyed washer can be retrofitted to existing products therefore substantially increasing the cost savings. The tab is substantially contained within the keyway to provide a compact arrangement, and the area adjacent the keyway remains relatively unencumbered by additional structure.

These and other objects, features and advantages of the present invention will become apparent to one skilled in the art upon reading the following detailed description in view of the drawings.

DETAILED DESCRIPTION OF THE DRAWINGS

Figure 1:
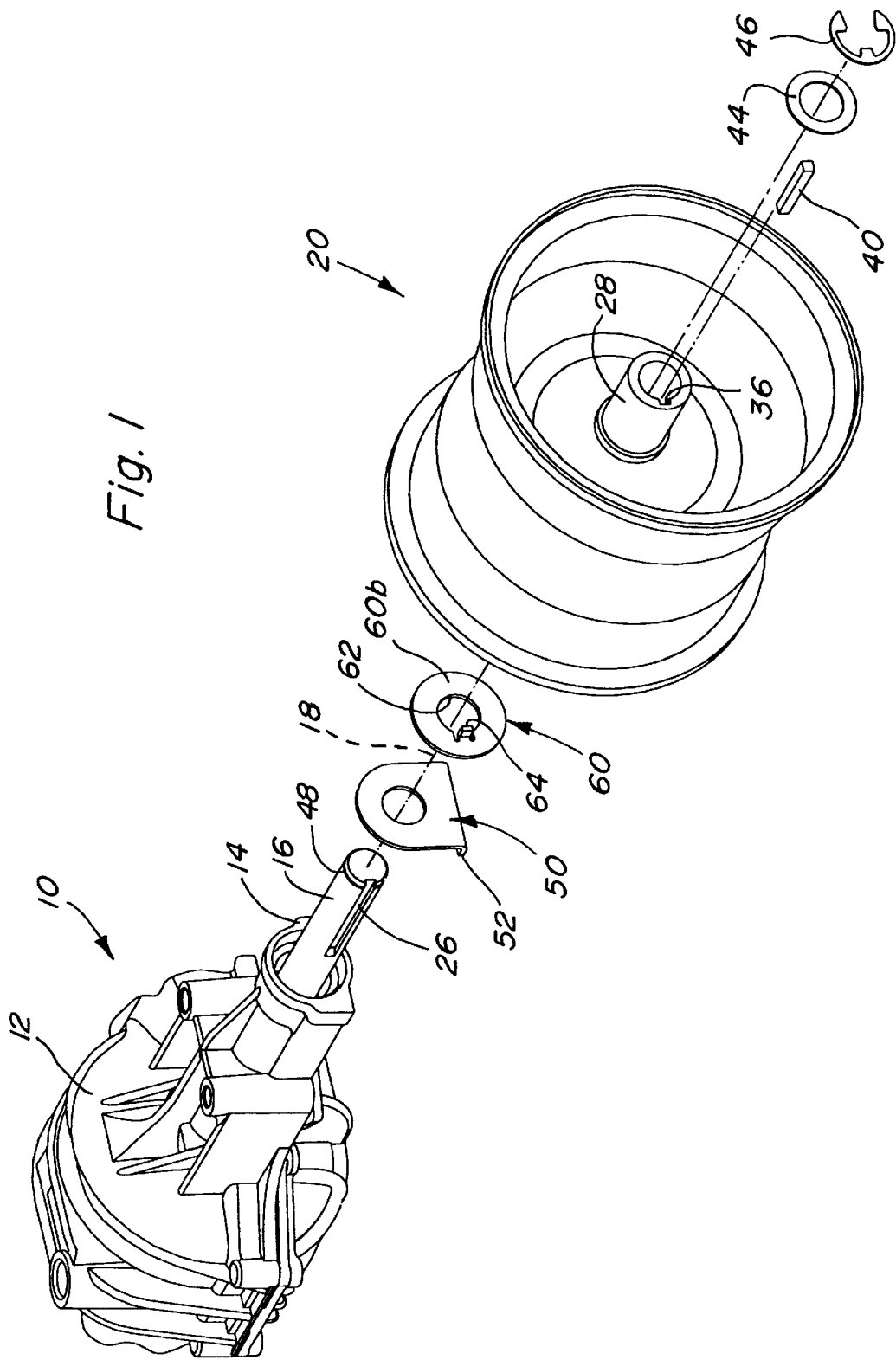
FIG. 1 is an exploded view of a portion of a transmission and drive wheel structure showing the thrust washer arrangement of the present invention.

Referring now to FIG. 1, therein is shown a portion of a transmission or transaxle 10 for a lawn and garden tractor or similar vehicle. The transaxle 10 includes a housing 12 with a housing end area 14. A drive shaft or axle 16 projects outwardly from the housing end area 14 for rotation about a transversely extending axis 18. Drive wheel structure 20 is keyed to the shaft 16 for rotation with the shaft about the axis 18. Seal structure (not shown) in the end area 14 seals between the shaft 16 and the housing to prevent transmission fluid from leaking from the transaxle 10.

The shaft 16 includes an axially extending groove or keyway 26, and the wheel structure 20 includes a hub 28 with a corresponding groove or keyway 36 which aligns with the keyway 26 when the drive wheel structure is mounted on the shaft 16. A key 40 having a rectangular cross section conforming to the keyways 26 and 36 is positioned in the keyways to constrain the wheel structure 20 for rotation with the shaft 16. The structure 20 can freely float axially on the shaft 16 in such a way that thrust is delivered against the housing end area 14 of the transaxle housing 12 by the inside end of the hub 28. A washer 44, along with a snap ring 46 which fits in a circumferential groove 48 at the end of the shaft 16, maintain the wheel structure on the shaft 16.

To prevent the inside end of the hub 28 from wearing into the housing end area 14 and damaging the seals, a fixed L-shaped washer 50 is positioned over the shaft 16 against the housing 12. The washer 50 includes a lower projection 52 which fits against the housing 12 to prevent rotation of the washer 50. To prevent the washer 50 from prematurely wearing through, a second washer 60 is positioned over the shaft 16 against the outer face of the washer 50 and is constrained to rotate with the wheel hub 28. The thrust forces are therefore spread over a greater area so that wear is reduced and both washers 50 and 60 have increased life.

Figure 2:
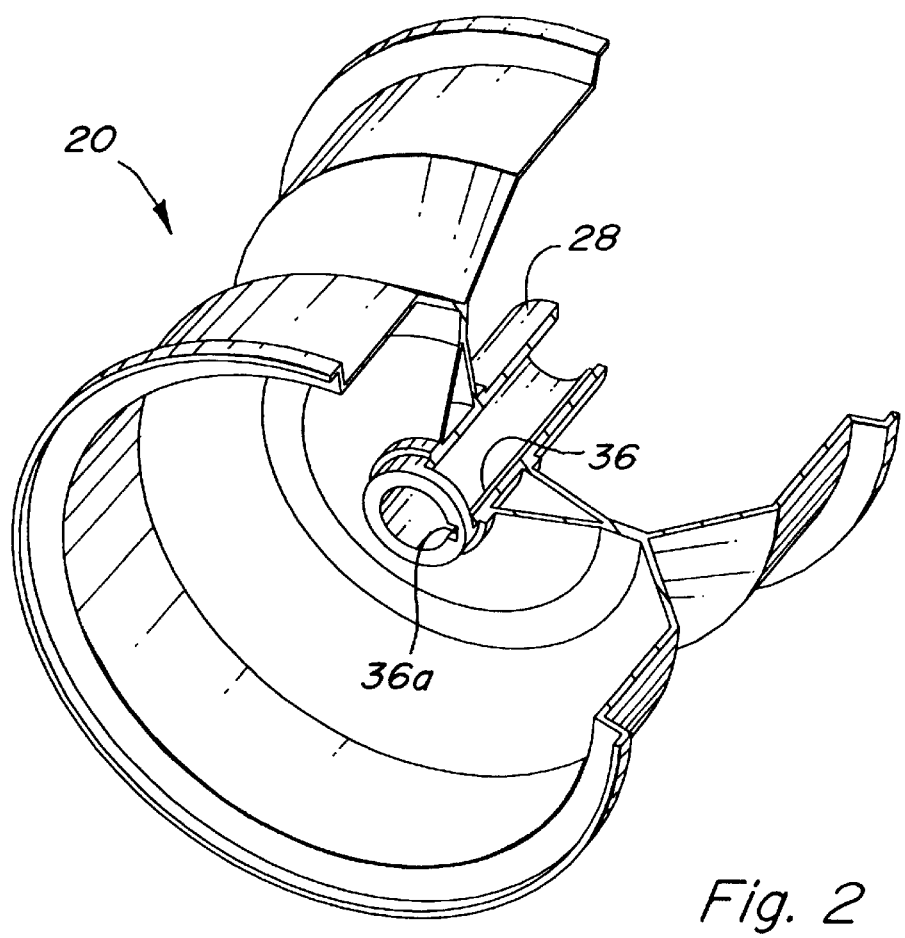
FIG 2 is a perspective view of a portion of the hub area of the wheel structure of FIG. 1 partially cut away to more clearly show the keyway.
Figures 3, 4:
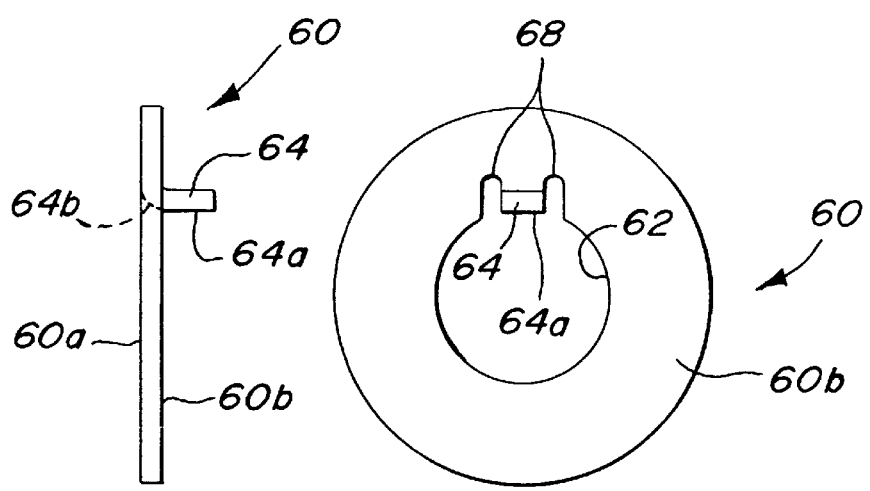
FIG. 3 is an enlarged end view of the thrust washer of the arrangement of FIG. 1.
FIG. 4 is a front view of the washer of FIG. 3.

The washer 60 includes opposite inner and outer planer faces 60a and 60b and a central circular opening 62 of diameter slightly larger than the diameter of the shaft 16. A tab 64 projects outwardly from the washer 60 at an angle of 90 degrees from the washer face at the periphery of the opening 62 with the bottom of the tab 64a lying generally on the periphery. As shown (FIG. 2) the tab 64 engages inner end 36a of the existing keyway 36 and is substantially contained within the keyway. The tab 64 constrains the washer 60 to rotate with the wheel hub 28 without need for a separate groove machined in the inside end of the hub 28. Rounded notches 68 project radially outwardly from the opening 62 adjacent the sides of the tab 64 to facilitate the outward bending of the tab while maintaining a strong bend location that will resist fracturing during operation. The structure assures that the washer 60 can be fabricated with a strong tab connecting area without projecting the bend location (see 64b of FIG. 3) outside the planes of the opposite faces of the washer 60, thereby obviating any need for an additional groove in the hub 28.

In operation, the face of the hub 28 adjacent the keyway end 36a abuts the face 60a of the washer 60. The washer tab 64 is received within the keyway end 36a so the washer 60 rotates with the wheel structure 20 as the transaxle 10 drives the shaft 16. The inner face 60a of the washer 60 rotates against the outer face of the fixed washer 50 to spread the thrust forces over a relatively large area so that wear is reduced.

Having described the preferred embodiment, it will become apparent that various modifications can be made without departing from the scope of the invention as defined in the accompanying claims.

What is claimed is:

1. In a drive for a driven vehicle including a transmission having a transmission housing, a drive axle projecting from the housing, drive wheel structure supported on the drive axle, and a keyway extending between the drive wheel structure and the drive axle, a key supported in the keyway and transmitting drive from the drive axle to the drive wheel structure, a thrust washer structure preventing wear of the transmission housing as the drive wheel structure is urged axially towards the transmission housing as the vehicle is driven, the thrust washer structure comprising: a fixed washer supported by the transmission, a generally flat washer having an opening defining a generally circular opening periphery slidably received over the drive axle for rotation against the fixed washer and including a tab projecting from the flat washer at generally a right angle to the flat washer, and wherein the tab includes a bottom surface lying generally on the periphery and is received in the keyway to constrain the flat washer for rotation with the drive wheel structure without need for additional notched structure to receive the tab.

2. The thrust washer structure as set forth in claim 1 wherein the keyway includes a groove portion extending to one end of the drive wheel structure and wherein the tab is received within the groove portion at the one end.

3. The thrust washer structure as set forth in claim 2 wherein the groove portion is located in the drive wheel structure.

4. A thrust washer adapted for mounting on and rotation with a wheel-receiving drive shaft with a keyway structure of preselected depth projecting axially from a transmission housing, the thrust washer comprising:

a planar annular housing-adjacent portion with a central drive shaft-receiving circular opening defining an opening periphery, and a rotation-constraining tab projecting axially at generally a right angle to the plane of the annular portion at the central opening and adapted for receipt by the keyway structure, wherein the tab has a bottom surface lying generally on the periphery.

5. The thrust washer as set forth in claim 4 wherein the tab projects from the periphery.

6. The thrust washer as set forth in claim 5 further including notches projecting radially from the periphery on opposite sides of the tab.

7. The thrust washer as set forth in claim 5 wherein the tab has a thickness no greater than the preselected depth of the keyway.

8. The thrust washer as set forth in claim 5 wherein the annular portion includes first and second planar faces, and wherein the tab includes a bend location located substantially entirely between the planar faces.

* * * * *